Figure 1:
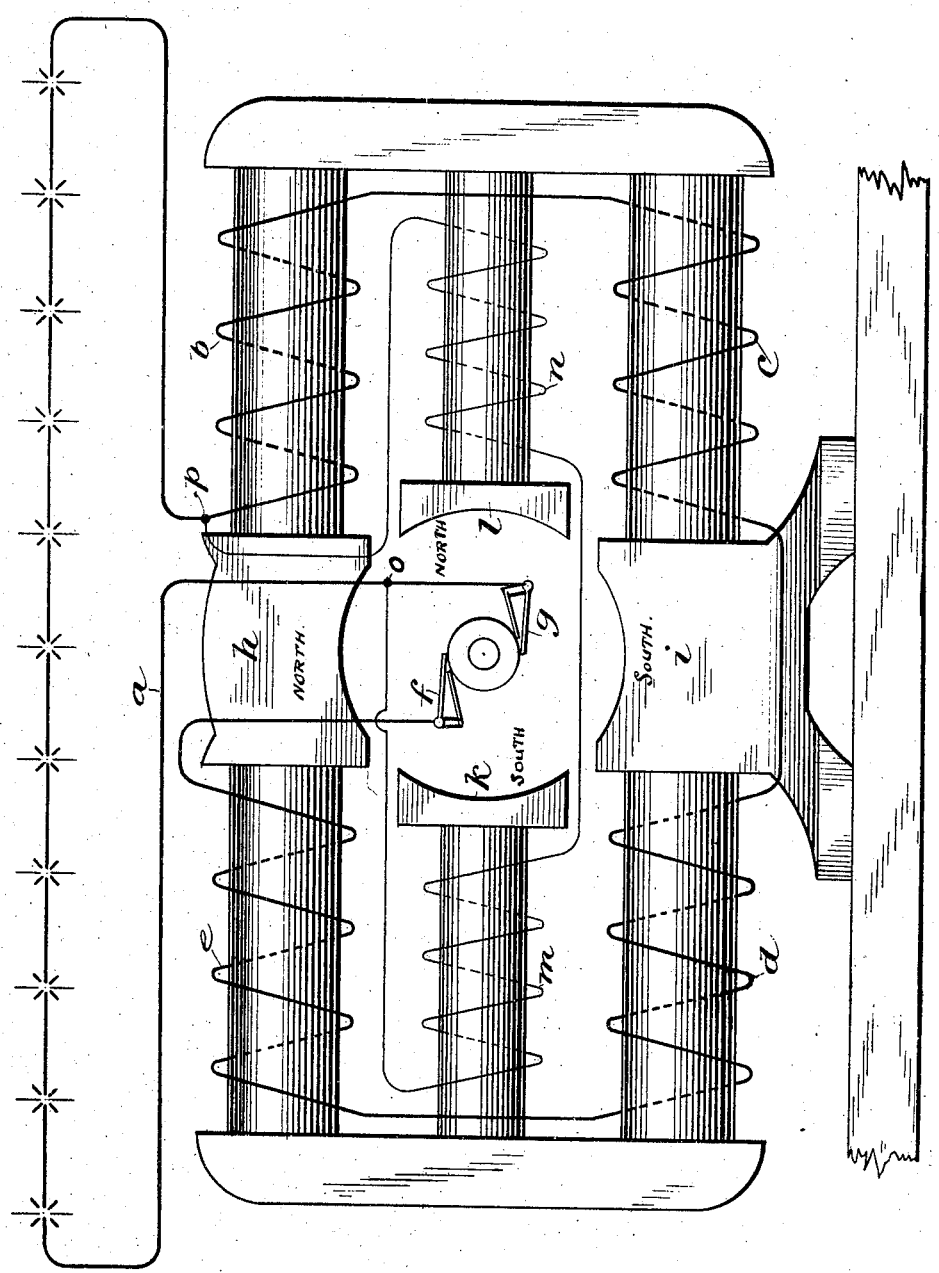

(No Model.)

2 Sheets—Sheet 1.

C. E. SCRIBNER.
DYNAMO ELECTRIC MACHINE.

No. 509,954.

Patented Dec. 5, 1893.

Witnesses.
O. G. Hawley.
Geo. R. Parker.

Inventor.
Charles E. Scribner.
By George P. Barton
Attorney.

(No Model.)
2 Sheets—Sheet 2.

C. E. SCRIBNER.
DYNAMO ELECTRIC MACHINE.

No. 509,954.
Patented Dec. 5, 1893.

Witnesses.
C. G. Hawley.
Geo. R. Parker.

Inventor.
Charles E. Scribner
By George P. Barton
Attorney.

UNITED STATES PATENT OFFICE.

CHARLES E. SCRIBNER, OF CHICAGO, ILLINOIS, ASSIGNOR TO THE WESTERN ELECTRIC COMPANY, OF SAME PLACE.

DYNAMO-ELECTRIC MACHINE.

SPECIFICATION forming part of Letters Patent No. 509,954, dated December 5, 1893.

Application filed June 1, 1889. Serial No. 312,918. (No model.)

*To all whom it may concern:*

Be it known that I, CHARLES E. SCRIBNER, a citizen of the United States, residing at Chicago, in the county of Cook and State of Illinois, have invented a certain new and useful Improvement in Dynamo-Electric Machines, (Case No. 188,) of which the following is a full, clear, concise, and exact description, reference being had to the accompanying drawings, forming a part of this specification.

In the operation of a dynamo electric machine the coils are short circuited successively and during the time each is short circuited the polarity of its current changes; such a short circuiting occurs twice in the revolution of each coil or each distinct portion of the armature. The coils intermediate of the short circuited coils at any given instant I have termed the current producing coils. I have discovered that in order that objectionable sparking may be avoided at the brushes that the current built up in each coil while it is short circuited should be of the same direction and strength as that in the circuit of the current producing coils into which it is introduced when the short circuit is removed; that is to say, while each coil is short circuited its current goes to zero and then is built up to a certain extent; by controlling the building up of this current in such manner as to make the current built up equal to that in the circuit of the current producing coils into which it is introduced objectionable sparking is avoided. I thus control the building up of the current in the short circuited coils by making the field of force affecting such coils of the proper strength to produce the desired result.

In my application Serial No. 312,921 (Case No. 196) I have described and claimed the method of preventing sparking which consists in building up current in the short circuited coil while it is short circuited equal in amount to the current in the current producing coils into the circuit of which the short circuited coil is introduced.

My invention herein consists essentially in providing a field for the short circuited coils which field is energized by field magnets having their windings in a circuit having a current which is approximately constant.

My invention further consists in providing a field for the current producing coils which field is energized by the field magnets having their windings in a shunt circuit around the translating devices, as for example, around the arc lights of an electric lighting system. The construction is such that the machine is self regulating without movement of any of the parts of the dynamo with relation to one another.

Figure 2:
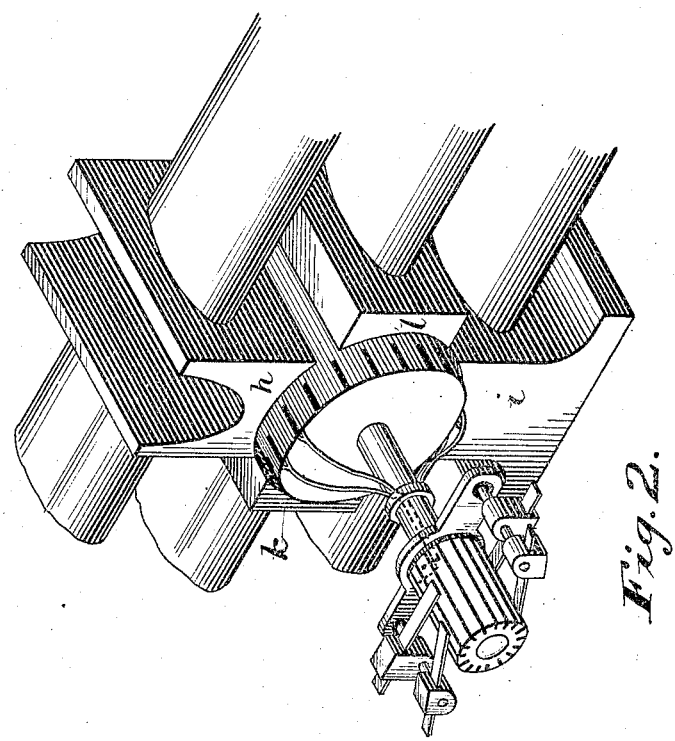

In the accompanying drawings—Figure 1 is a diagram illustrative of an arc light circuit connected with a dynamo embodying my invention. Fig. 2 is an isometric view of the commutator, armature and field magnet poles showing the relation of the poles to the short circuited coils.

Like parts are indicated by similar letters of reference throughout the different figures.

Referring now to Fig. 1 it will be seen that the main circuit $a$ including the lamps may be traced through the coils $b\ c\ d\ e$ of the field magnets of the short circuited coils and thence through the pairs of brushes $f\ g$. The poles $h\ i$ are thus magnetized by the coils $b\ c\ d\ e$ included in the main circuit. In addition to these field magnets of the short circuited coils I have provided the pair of magnets $k\ l$ provided with the coils $m\ n$; these coils $m\ n$ are included in a shunt circuit between points $o$ $p$, points $o\ p$ being connected with different sides of the arc light circuit; these magnets $k\ l$ are in position to influence the current producing coils. That is to say, the magnets $k\ l$ which have their coils included in the shunt between the points $o\ p$ on different sides of the lamps are so placed with reference to the brushes and the revolving armature as to produce a field, the lines of force of which are cut by the portions of the armature which I have denominated as the current producing coils. Now it is evident that as the number of lamps in the circuit is increased the current remaining the same as required more current will be sent through the coils $m\ n$, in other words the increase of work to be done increases the field of the coils which produce the current to do the work, and vice versa. The poles $h\ l$ being north the poles $i\ k$ should be south.

The poles $h\ i$ are in position to produce a field which is cut by the short circuited coils and the windings $b\,c\,d\,e$ must be proportioned with reference to the main field magnets; in other words, the winding of these coils $b\,c\,d\,e$ must be such that the circuit built up in the short circuited coils will be equal to the current in the circuit of the current producing coils into which the short circuited coils are introduced; therefore, this winding will be varied for different machines.

I find that between fifty and sixty thousand ampère turns No. 16 wire upon poles which determine the electro motive force of the dynamo to a dynamo of one thousand to twelve hundred volts maximum capacity to be right to give the desired regulation. The size of the field should be so proportioned that this number of ampère turns of No. 16 wire will have a resistance of from five to six hundred ohms. The main fields may be varied to give the proper current in the short circuited coil upon first building the dynamo, the number of ampère turns necessary depending upon the character of the iron used and the shape of the pole pieces of the main field cores.

If the dynamo at one thousand volts with the brushes clean gives a current higher than is desired a reduction in the number of ampère turns upon the magnets whose poles $h\,i$ are placed over the short circuited coils can be made to bring the current to the desired strength.

I am aware that prior to my invention dynamos have been constructed in which more than two field magnet pole pieces were provided and in which the different pole pieces were adjustable in strength with relation to each other but in none of these prior inventions was provision made for maintaining a practically constant field of force to be cut by the short circuited coils of the armature while the other portions of the field of force acting upon the current giving coils were variable.

Having thus described my invention, I claim as new and desire to secure by Letters Patent—

1. In a dynamo electric machine, the combination with the armature, of field magnets adapted to produce a divided field, one portion of the field being generated by a coil included in the main circuit and the other portion being generated by a coil included in a shunt of the load, said fields being so disposed that the portion of the field generated by the main circuit energizes the short circuited portion of the armature and the portion of the field generated by the shunt circuit energizes the rest of the armature.

2. In a dynamo electric machine, the combination with an armature, portions of which are short circuited during its revolution, with field magnets adapted to generate a field of force and energized by the current generated in said armature, one portion of said field of force which is being cut by the short circuited portion of the armature being maintained at a practically constant strength, while the other portion of the field of force is varied automatically by the variation of the load.

In witness whereof I hereunto subscribe my name this 7th day of May, A. D. 1889.

CHARLES E. SCRIBNER.

Witnesses.
ELLA EDLER,
GEORGE P. BARTON.